United States Patent
Mertz, Jr.

(10) Patent No.: US 7,118,149 B1
(45) Date of Patent: Oct. 10, 2006

(54) CYLINDER CARRYING AND CHOCKING APPARATUS AND METHOD

(76) Inventor: Kenneth A. Mertz, Jr., 2750 Jean LaFitte Dr, Fernandina Beach, FL (US) 32034

( * ) Notice: Subject to any disclaimer, the term of this patent is extended or adjusted under 35 U.S.C. 154(b) by 249 days.

(21) Appl. No.: 10/604,880

(22) Filed: Aug. 23, 2003

(51) Int. Cl.
*B65G 7/12* (2006.01)

(52) U.S. Cl. .................... 294/152; 294/141; 294/150; 294/154; 294/157

(58) Field of Classification Search ............... 294/141, 294/142, 150, 152, 153, 154, 157, 164, 165, 294/170; 182/196, 199
See application file for complete search history.

(56) References Cited

U.S. PATENT DOCUMENTS

| | | | | |
|---|---|---|---|---|
| 466,670 | A | * | 1/1892 | Fler ........................... 294/152 |
| 2,514,096 | A | * | 7/1950 | Shreiner .................... 294/1.1 |
| 4,139,080 | A | * | 2/1979 | Wells ......................... 182/115 |
| 4,469,363 | A | * | 9/1984 | Kalla ......................... 294/154 |
| 4,586,745 | A | * | 5/1986 | Shepard ..................... 294/150 |
| 4,696,504 | A | * | 9/1987 | Roberts, Jr. ................ 294/148 |
| 4,699,416 | A | * | 10/1987 | Lacey ........................ 294/152 |
| 4,754,996 | A | | 7/1988 | Tecca et al. |
| 4,804,218 | A | | 2/1989 | Hilliard |
| 5,183,334 | A | * | 2/1993 | Geistlinger ................ 366/129 |
| 5,511,846 | A | | 4/1996 | Fuller |
| 5,549,339 | A | | 8/1996 | Frean |
| D433,812 | S | * | 11/2000 | Newby ....................... D3/327 |
| 6,536,820 | B1 | * | 3/2003 | Dean et al. ................ 294/159 |

FOREIGN PATENT DOCUMENTS

AU 9181462 2/1992

* cited by examiner

*Primary Examiner*—Dean J. Kramer
(74) *Attorney, Agent, or Firm*—Rigdon Patents & Engineering P.C.; Jonathan R Smith

(57) ABSTRACT

A carrier for a scuba tank or other cylindrical bottle comprises two cylindrical handles connected by a looped rope, the rope passing slidably through one of the handles. The scuba tank is supported by the ropes and carried by one handle looped through the rope. The handles may also be used to chock the tank against rolling in a vehicle, by placing the tank next to one handle and sliding the other handle up against the tank.

10 Claims, 7 Drawing Sheets

CYLINDER CARRYING AND CHOCKING APPARATUS AND METHOD

BACKGROUND OF INVENTION

This invention is in the field of article carriers and supports, more specifically in the field of carriers and supports for compressed gas bottles, and more specifically still in the field of hand carriers for scuba tanks. The invention also pertains to the secure transport of compressed gas bottles in vehicles, and more specifically to the transport of scuba tanks to and from dive sites by vehicle and by hand. Although this invention can be used on a variety of cylinders, for simplicity the terms "scuba tank" or "tank" will generally be used herein to represent the item being carried by the invention.

Because they are generally comprised of thick-walled metal, compressed gas bottles are relatively heavy objects to carry by hand. Only small ones such as scuba tanks can be carried by hand at all without some kind of aid to hand carriage, and even then not comfortably and not for long distances. Their shape, generally cylindrical, flat or dished at one end and rounded with an axially-installed valve at the other, makes them ungainly; many users handle them by the valve or regulator. This is not recommended, because these parts are not shaped for secure grasp and allow some chance for dropping the bottle. If the bottle is dropped, personal injury or damage to the bottle can occur; in the worst case, catastrophic failure of the valve stem could occur with explosive release of the compressed gas. It is also possible to open the valve slightly while handling a gas bottle by its valve or regulator.

These contingencies have led to the creation of a number of carrying devices for gas bottles. Two examples: U.S. Pat. No. 5,511,846 to Fuller teaches a pouch with two handles; and U.S. Pat. No. 4,804,218 to Hilliard teaches circumferential straps with flexible handles. The drawback to these devices is that the handles are not adjustable and they do not prevent the bottle from rolling around in a vehicle.

Anti-roll features are taught by U.S. Pat. No. 4,754,996 to Tecca, et al., and U.S. Pat. No. 5,549,339 to Frean, which describe flat bases affixed to a gas bottle along with straps. These devices have more parts and structure than the present invention.

An invention bearing some similarities in appearance to the present invention is described in Australian patent no. 81462/91 to Russell. It discloses parallel rigid tubes affixed to a rope, but the tubes serve as a support for a scuba tank and not as handles.

SUMMARY OF INVENTION

The present invention comprises a rope and two rigid elongate handles, the rope being fixed to one end of the first handle, threaded through first one end and then the other end of the second handle, and finally fixed to the other end of the first handle. The rope thereby forms a loop with two sides of the rope loop running through the second handle. This allows the second handle to be slid along the two sides of the rope to increase or decrease the distance between the handles. To use the device to carry a scuba tank, the rope and handles are first laid on a flat surface to form a rectangle with the handles being the right and left sides of the rectangle and the two sides of the rope loop being the top and bottom. The scuba tank is placed on the rope (parallel to the handles) and the handles are lifted and brought together, causing the two sides of the rope to encircle the tank. The second handle is then inserted between the two sides of the rope coming from the first handle (or vice versa) and lifted to bring the scuba tank off the surface.

The tank can be transported in a vehicle with reduced potential for rolling around in the vehicle by lowering the tank (held by the invention) into a flat space in a vehicle (such as a trunk), separating the handles, and laying them out on either side of the tank. The fixed handle is placed against the tank, and the slidable handle is drawn up against the tank by pulling the rope outward from the tank through the holes in that handle. Frictional engagement between the handles and the tank prevents rolling of the tank on the surface. Another embodiment of the invention provides a portion of each handle with at least one flat side so as to further inhibit rolling.

The handles are coated with resilient friction-enhancing material to provide a more comfortable grip while it is carried and to engage the wall of the tank to inhibit roll when it is supported by a flat surface.

It is an object of this invention to provide a simple and inexpensive method for safely hand-carrying a scuba tank or other gas bottle with one hand. Another object of the invention is to provide means to prevent such tank from rolling on a flat surface, such as within a moving vehicle.

DETAILED DESCRIPTION

Figure 1:
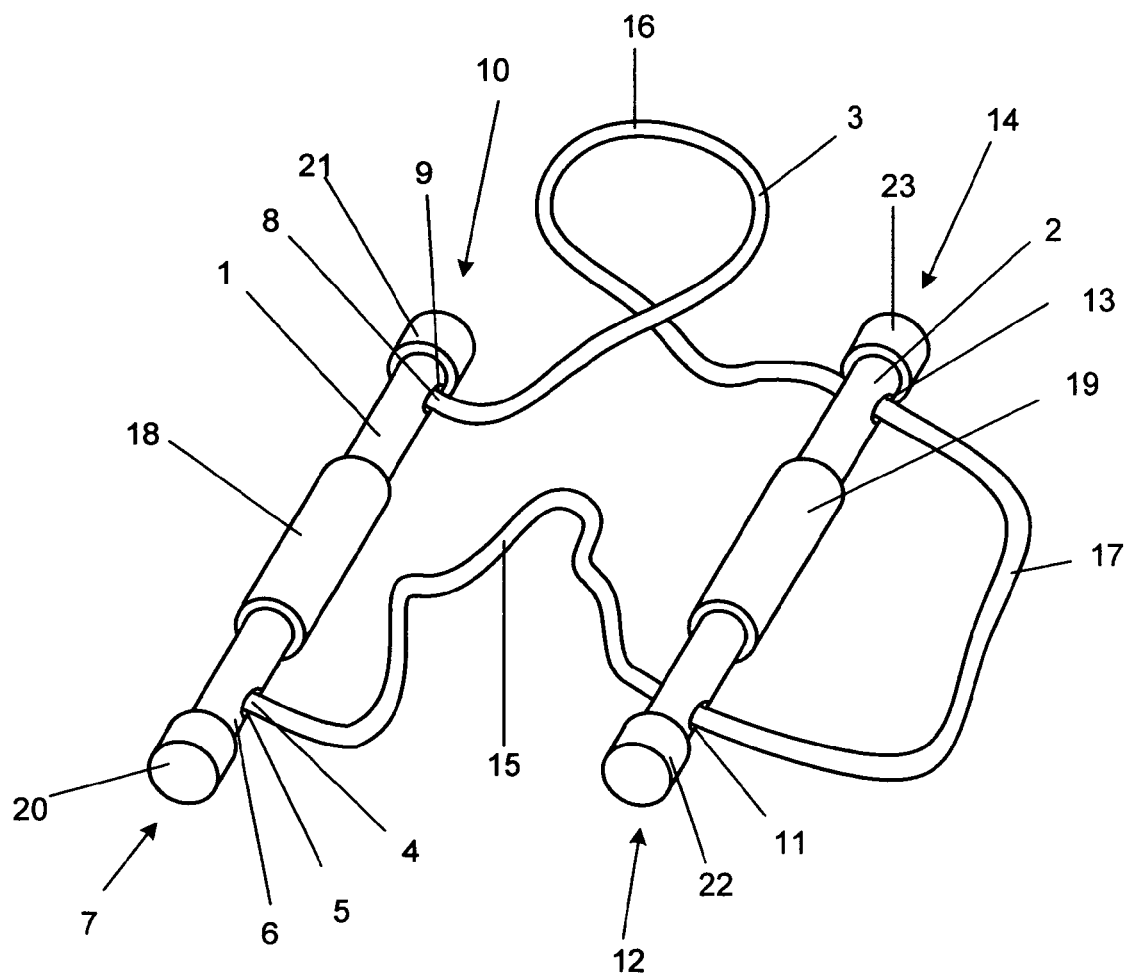
FIG. 1 is a perspective view of the first, preferred, embodiment of the invention before a scuba tank is placed in it.

Referring now to the drawings, in which like features have been given the same reference numbers in each of the figures, FIG. 1 is a perspective view of a first, preferred, embodiment of the invention before a scuba tank is placed in it. It consists of two hollow cylindrical handles, a fixed handle 1 and a sliding handle 2, joined together by a rope 3. The rope 3 has a first end 4, secured within a first hole 5 drilled through one side 6 of near end 7 of fixed handle 1, and a second end 8 secured within a second hole 9 drilled through the same side 6 of far end 10 of fixed handle 1. The sliding handle 2 slides freely along rope 3 because rope 3 is inserted through a third hole 11 through near end 12 of sliding handle 2, and again through a fourth hole 13 through far end 14 of sliding handle 2. Rope 3 is thus divided roughly into a near portion 15, a far portion 16, and a median portion 17. It is apparent that by grasping its median portion 17, rope 3 can be pulled rightward until the rope is straight between the two handles. Likewise, near portion 15 and far portion 16 can be pulled leftward until median portion 17 rests against handle 2.

Handles 1 and 2 are further equipped with resilient grips 18 and 19, respectively, located in middle of each handle, and near and far end caps 20, 21, 22, and 23, respectively, ensconced upon the ends of the handles to protect the handles and objects that may come into contact with the handles. An adequate means of securing the rope ends 4 and 8 within the first and second holes 5 and 9 of the first handle 1 is to tie knots (not shown) in the rope ends before end caps 20 and 21 are put on.

Figure 2:
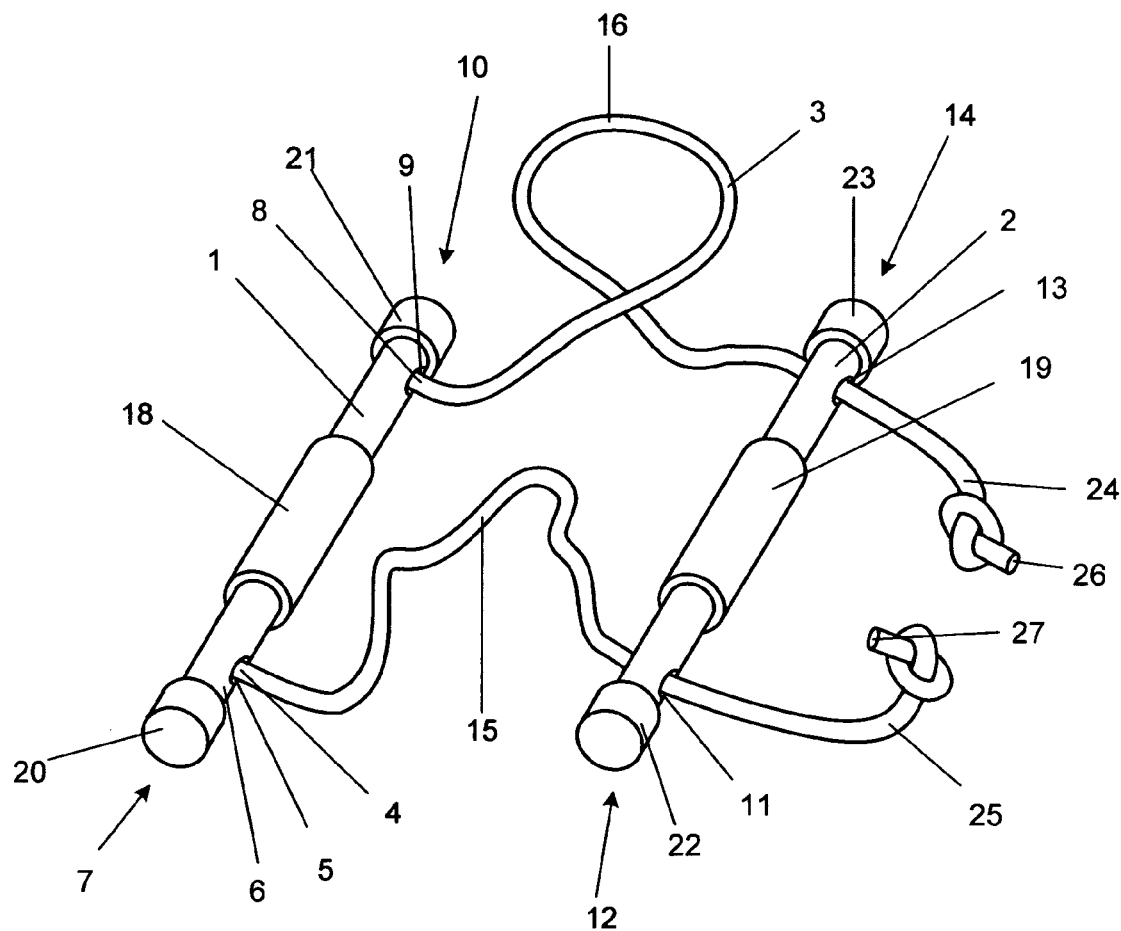
FIG. 2 is a perspective view of a second embodiment.

FIG. 2, a second embodiment of the invention, involves dividing median portion 17 of rope 3 into separate ropes 24 and 25 and tying off the new ends 26 and 27 or providing other means for preventing the new ends from being pulled out of third hole 11 or fourth hole 13. It is useful to note that claims 10 through 18 of the present specification are directed towards this second embodiment.

Figure 3:
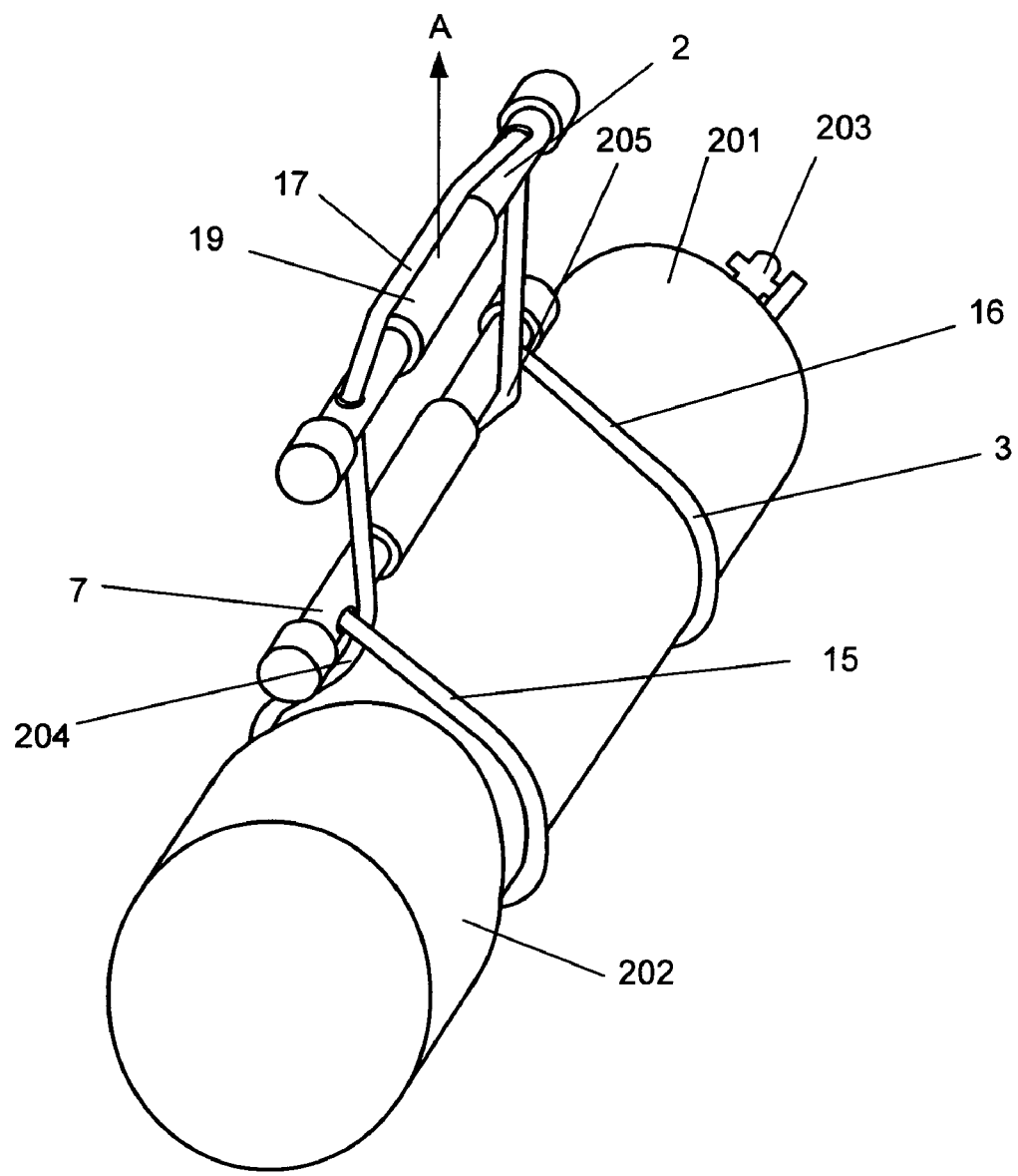
FIG. 3 is a perspective view of the preferred embodiment carrying a scuba tank.

FIG. 3 is a perspective view of the first embodiment carrying a scuba tank 201. The tank 201 is shown with a typical bottom cap 202 and valve stem 203, which are not part of the invention. To carry the tank, the near portion 15 and the far portion 16 of the rope 3 are wrapped around the tank 201, and sliding handle 2 is inserted between the near and far portions 15 and 16. When sliding handle 2 is pulled upward by the hand of a user, represented by arrow A, grasping sliding resilient grip 19, sliding handle 2 slides upward on rope 3 until it is stopped by the median portion 17 of the rope 3. Farther upward motion by the user lifts everything.

It is evident that the invention will function equally well if fixed handle 1 instead of sliding handle 2 is inserted between the near and far rope portions 15 and 16, while still lifting sliding handle 2. This would place rope bights 204 and 205 outside of rope portions 15 and 16, respectively, instead of inside as shown. It is also evident that the invention will function if the positions of fixed handle 1 and sliding handle 2 are swapped in the above combinations.

Figure 4:
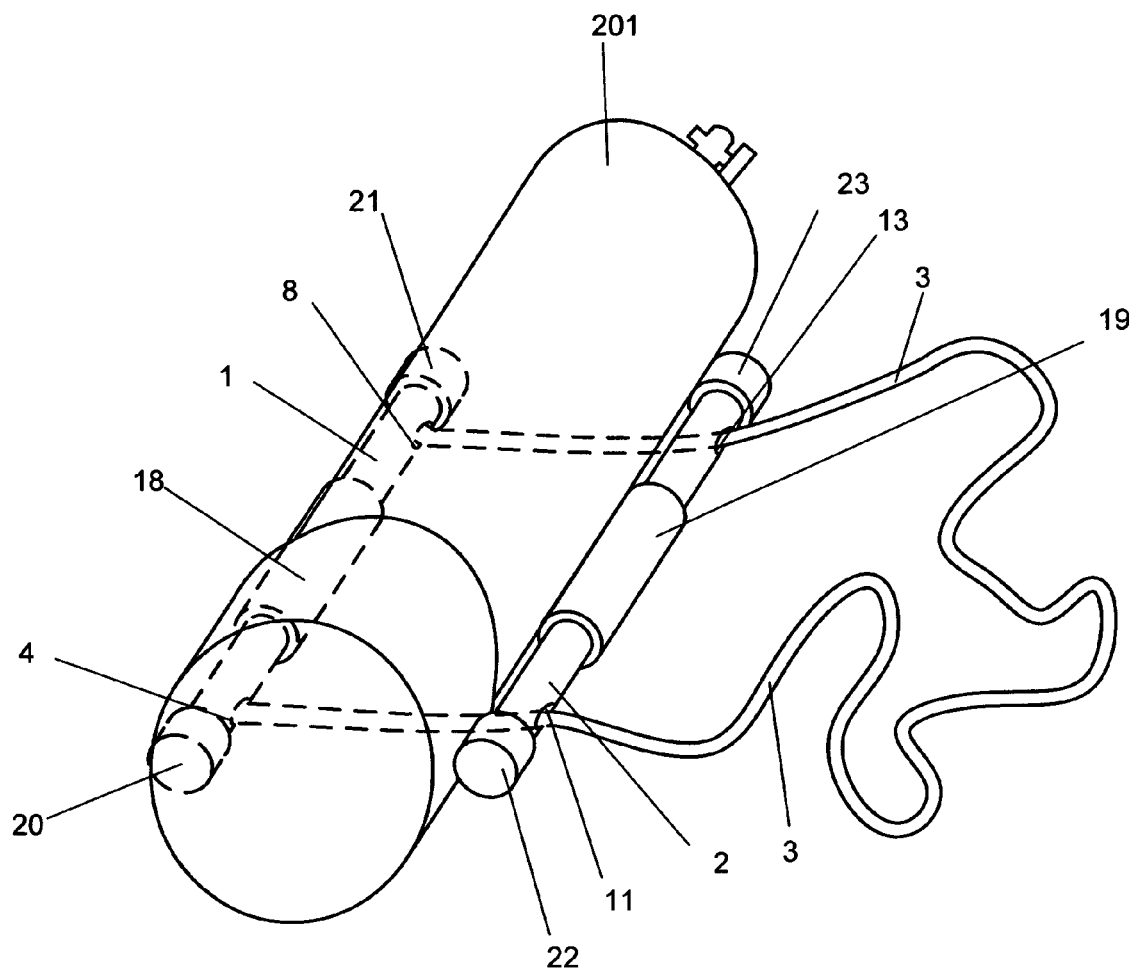
FIG. 4 is a perspective view of the preferred embodiment being adjusted to prevent rolling of a scuba tank on a flat surface.

FIG. 4 is a perspective view of the invention being adjusted to prevent rolling of tank 201 on a flat surface. Fixed handle 1 is first placed alongside tank 201, so that fixed handle resilient grip 18 or end caps 20 and 21 are in contact with tank 201. Sliding handle 2 is then secured against the opposite side of tank 201 by holding sliding handle resilient grip 19 against the tank and pulling as much of rope 3 rightward as possible. If the tank is urged to roll rightward (for example) by motion of the surface, resilient grip 19 will try to roll leftward, thus inhibiting rolling. Twisting of the rope 3 within through holes 11 and 13 will further inhibit rolling. Leftward roll in this view is prevented by fixed handle 1 being held by rope ends 4 and 8, as well as by the opposing roll tendency of fixed handle 1 against tank 201. The diameters of end caps 20, 21, 22 and 23 are shown here being equal to that of grips 18 and 19, as that maximizes contact between the tank, the handles, and the surface, but it is not necessary.

Figure 5:
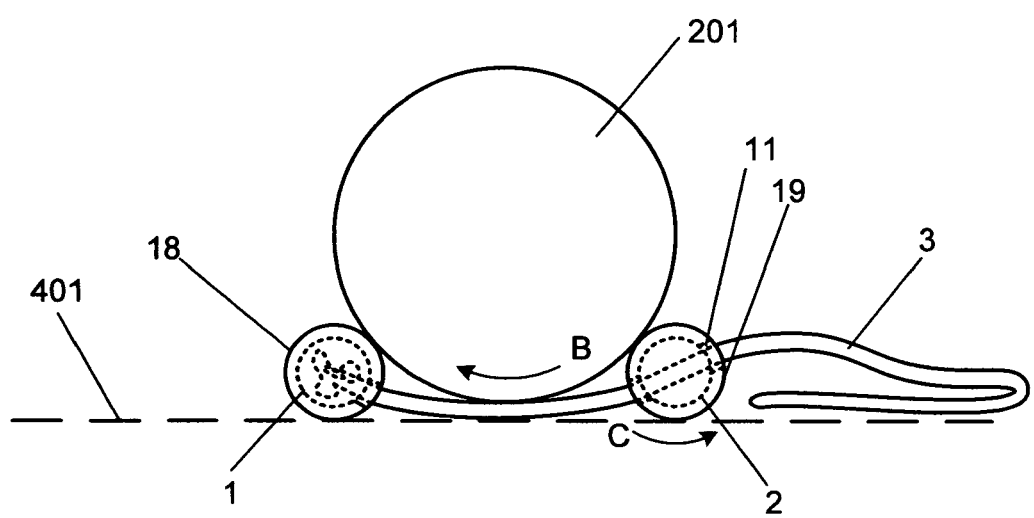
FIG. 5 is an end view of the preferred embodiment and a scuba tank on a flat surface.

FIG. 5 is a near end view of the invention and a scuba tank 201 on a flat surface 401, more clearly showing that tank rotation B reacts against surface 401 oppositely to rotation C of handle 2. It is evident as well that twisting of rope 3 within through hole 11 by significant rotation of handle 2 will interfere with rolling.

Figure 6:
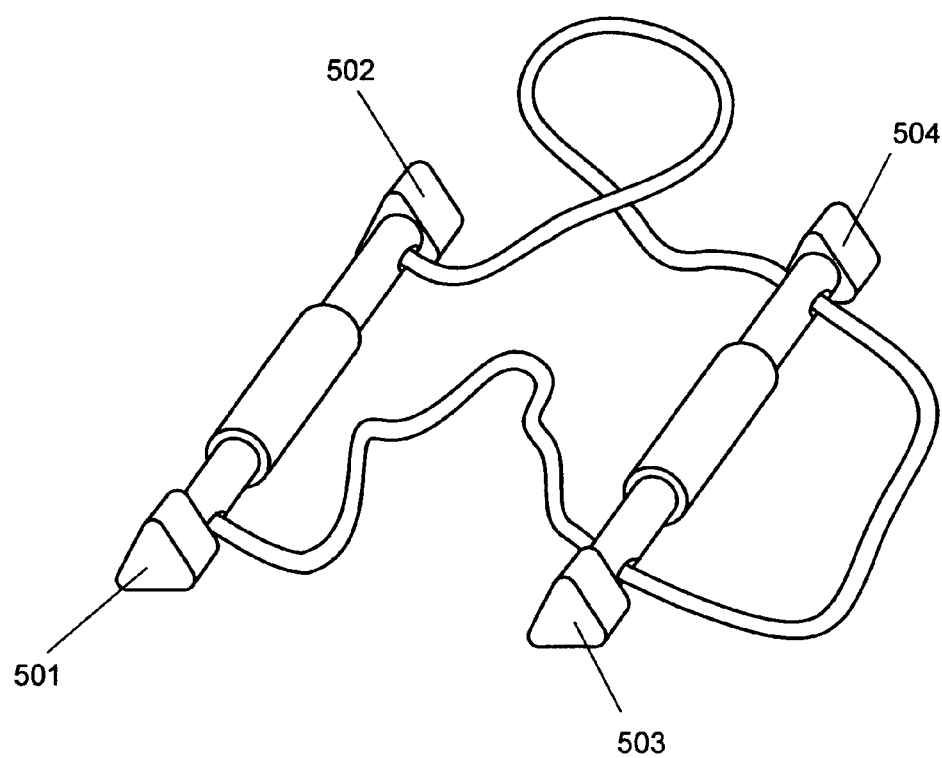
FIG. 6 is a perspective view of a third embodiment of the invention.

FIG. 6 is a perspective view of a third embodiment of the invention. In this embodiment, angular blocks 501, 502, 503, and 504 replace end caps 20–23 in the earlier drawings. the flat sides of the angular blocks provide an added measure of roll prevention if desired.

Figure 7:
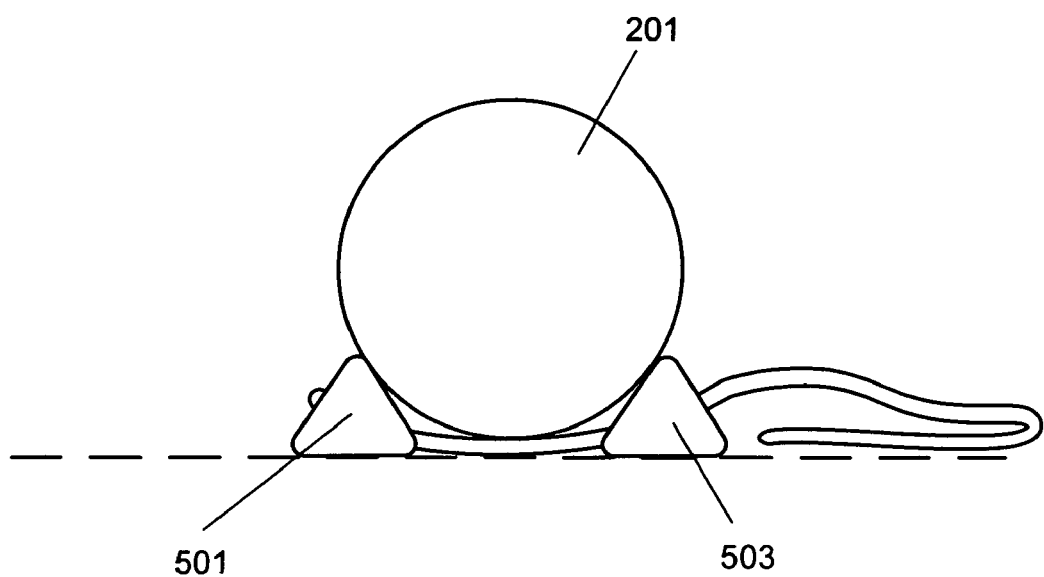
FIG. 7 is an end view of the third embodiment.

FIG. 7 is an end view of the third embodiment showing tank 201 chocked by angular blocks 501 and 503.

The invention claimed is:

1. A cylinder carrying and chocking apparatus, comprising:
    a first rigid elongate handle having a first end, a second end, and a first middle section;
    a rope having a third end and a fourth end, the third end being fixed to the first end and the fourth end being fixed to the second end;
    a second rigid elongate handle having a fifth end, a sixth end, and a second middle section, the fifth end having drilled through it a first hole, and the sixth end having drilled through it a second hole substantially parallel to the first hole, the diameter of the holes being larger than the diameter of the rope;
    the rope passing through the first and second holes so that the rope can slide through the holes; and
    the first, second, fifth, and sixth ends having end caps affixed thereto.

2. The apparatus of claim 1, wherein:
    said first middle section further comprises a first resilient grip; and
    said second middle section further comprises a second resilient grip.

3. The apparatus of claim 2, wherein:
    said grips further comprise non-skid material taken from the group of:
    a) rubber;
    b) polystyrene.

4. The apparatus of claim 1 wherein:
    each of said end caps has a cross-section perpendicular to the axes of said handles, the periphery of the cross-section having at least one flat.

5. The apparatus of claim 4 in which:
    said cross-section is a triangle.

6. A cylinder carrying and chocking apparatus, comprising:
    a first rigid elongate handle having a first end, a second end, and a first middle section;
    a first rope having a third end and a fourth end, the third end being fixed to the first end;
    a second rope being substantially equal in length and diameter to the first rope, and having a fifth end and a sixth end, the fifth end being fixed to the second end;
    a second rigid elongate handle having a seventh end, an eighth end, and a second middle section, the seventh end having drilled through it a first hole, and the eighth end having drilled through it a second hole substantially parallel to the first hole, the diameter of the holes being larger than the diameter of the ropes; and
    the first rope passing through the first hole so that it can slide back and forth through the first hole, and having at the fourth end means for preventing the first rope from being pulled out of the first hole; and
    the second rope passing through the second hole so that it can slide back and forth through the second hole, and having at the sixth end means for preventing the second rope from being pulled out of the second hole; and
    the first, second, seventh, and eighth ends have end caps affixed thereto.

7. The apparatus of claim 6, wherein:
    said first middle section further comprises a first resilient grip; and
    said second middle section further comprises a second resilient grip.

8. The apparatus of claim 7, wherein:
    said grips further comprise non-skid material taken from the group of:
    a) rubber;
    b) polystyrene.

9. The apparatus of claim 6 wherein:
    each of said end caps has a cross-section perpendicular to the axes of said handles, the periphery of the cross-section having at least one flat.

10. The apparatus of claim 9 in which:
    said cross-section is a triangle.

* * * * *